April 29, 1958　　　A. R. ABBOTT　　　2,832,908
TEMPERATURE COMPENSATION FOR A ROTATING ELECTRIC MACHINE
Filed July 24, 1956　　　　　　　　　　　　　2 Sheets-Sheet 1

INVENTOR.
ARTHUR R. ABBOTT
BY
*James and Franklin*
ATTORNEYS

INVENTOR.
ARTHUR R. ABBOTT
BY James and Franklin
ATTORNEYS

United States Patent Office 2,832,908
Patented Apr. 29, 1958

2,832,908

TEMPERATURE COMPENSATION FOR A ROTATING ELECTRIC MACHINE

Arthur R. Abbott, Dover, N. H., assignor to Eastern Air Devices, Inc., Dover, N. H., a corporation of New York Application July 24, 1956, Serial No. 599,802

19 Claims. (Cl. 310—171)

The present invention relates to a structure by means of which the functioning of rotating electric machines in general, and particularly induction tachometers, may be made substantially independent of temperature.

There are many occasions when the operation of rotating electric machines should remain constant and be independent of the particular ambient conditions to which the machine is subjected. Perhaps the most troublesome of these ambient conditions, insofar as its effect on the machine output is concerned, is temperature. This is particularly true because machines usually produce heat while operating so that their temperature almost always changes in the course of operation. The effect of heat may be noticed in changes in the spatial relationship of the various parts, thus affecting the magnetic circuitry, and changes in the resistance of the windings, thus affecting the electric circuitry.

One type of machine in which the effect of temperature is particularly troublesome is the so-called tachometer generator. This is a device the magnitude of the voltage output of which is to be proportional to the speed of rotation of its rotor. In one common form, the induction tachometer, it consists of two sets of stationary windings one of which is excited by some external source and the other of which constitutes the output winding. The magnetic circuitry is such that under normal conditions, with the rotor stationary, no flux from the exciting windings will link with the output windings, and hence there will be no voltage output. However, the rotor functions to magnetically link the two windings, the degree of magnetic linkage being proportional to the speed of rotation of the rotor, so that the voltage output will also be proportional thereto.

This proportionality of the voltage output to the speed of rotation of the rotor is, however, affected appreciably by the resistance both of the exciting and output windings, in accordance with known electrical laws. As the temperature of these windings increases their resistance will also increase, and consequently for a given speed of rotation of the rotor the losses in the windings will increase and hence at higher temperatures the voltage output will be less than its proper value.

In the past compensation for this effect has been achieved through the use of special windings having but a minimal change in resistance with changes in temperature, and by the use of resistors placed in series with the output windings and having a temperature coefficient of resistance substantially equal and opposite to that of the tachometer windings. These expedients are expensive, not too reliable, and involve some loss of efficiency.

The present invention solves the problem above set forth without the use of additional circuit elements by so designing the machine that the mechanical changes in the structure of the machine attendant upon variations in temperature will so affect the spatial positions of portions of the magnetic circuit of the machine as to modify that magnetic circuit and thus compensate for the temperature-induced changes in the electrical circuitry. More specifically, portions of the magnetic circuit, here specifically disclosed in the form of stator portions, are independently mounted on the machine support or frame by elements which have different temperature coefficients of expansion, those coefficients being so chosen that with an increase in temperature the magnetic circuit is modified so as to increase the flux passing therethrough, that increased flux being effective on the output windings to cause the output voltage to increase to a degree sufficient to make up for the increased losses in the windings due to increases in temperature.

This result may advantageously be achieved either by increasing the amount of iron or other magnetizable material in the magnetic circuit, by decreasing the air gap in the magnetic circuit, or both. In the form here specifically disclosed both of these effects are simultaneously realized, but it will be understood that by simple and obvious structural modifications either one of these approaches could be independently utilized.

In induction tachometers it is conventional to have the exciting and output windings arranged on a ring stator in a somewhat similar fashion to the windings in a two-phase motor stator, the windings alternating around the ring stator, and it is further conventional to provide an inner stator element in the form of an iron core inside that portion of the ring stator on which the windings are mounted, with an air gap between these two stator elements. A drag cup of magnetizable material is positioned for rotation in the space between the two stator elements.

In accordance with the present invention, one of the stator elements is mounted on the motor frame or support by a member which has a temperature coefficient of expansion different from that of the body of the machine support and arranged in such a way that with changes in temperature the relative positions of the winding-supporting outer stator element and the inner core element will vary with changes in temperature, increases in temperature causing more of the inner core to be inserted within the outer stator element. In order to increase the effect of this differential expansion, the opposed surfaces of the outer and inner stator elements are similarly inclined relative to the axis of the machine, so that as the inner core element moves into the outer stator element the space therebetween will decrease in width. These two effects work together to reduce the overall reluctance of the magnetic circuit and thus increase the magnitude of the flux passing therethrough.

It will be understood, of course, that the same results could be obtained if the rotor were mounted on the machine so that it would move relative to the stator in accordance with the changes in temperature so as to vary the air gap between itself and the stator. It will further be understood while the invention is here specifically disclosed in connection with an induction tachometer, it is applicable to many other types of rotating electric machines.

To the accomplishment of the above, and to such other objects as may hereinafter appear, the present invention relates to structure for automatic temperature compensation of a rotating electric machine as defined in the appended claims and as described in this specification, taken together with the accompanying drawings in which:

Figure 1:
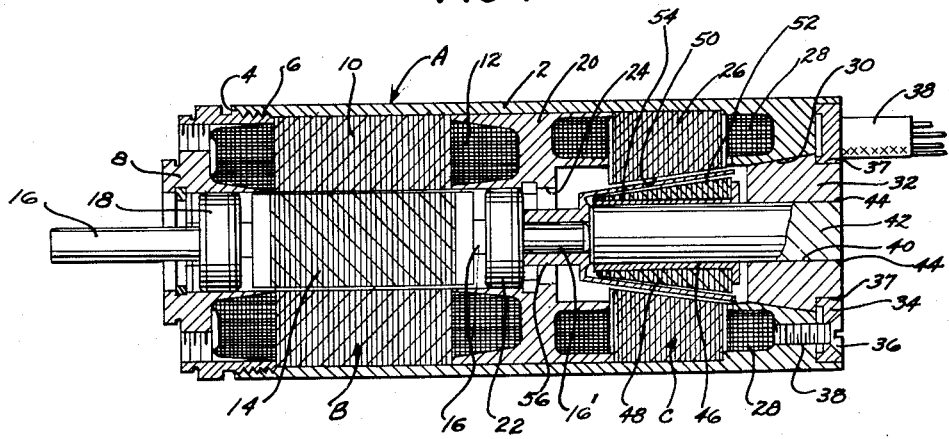
Fig. 1 is a cross sectional view of a motor and tachometer assembly in which the present invention is embodied.

The invention is here disclosed embodied in a single unit generally designated A comprising both a motor generally designated B and a tachometer C of the induction type. The unit comprises an outer shell 2 open at its end 4 and there internally threaded at 6 to receive an end closure 8. The motor stator 10 is secured to the shell 2 with the stator windings 12 thereon, and the motor rotor 14 is positioned for rotation within the stator 10 and is provided with output shaft 16 one end of which passes through bearing 18 carried by the end closure 8. A central partition 20 is provided inside the shell 2, and it carries bearing 22 in which the other end of the motor rotor shaft 16 is rotatably mounted, that shaft end having a tip 16' extending through the bearing 22 and through a central aperture 24 in the partition 20. The construction of the motor B and its mode of operation form no part of the present invention, and consequently no more detailed description thereof is here given.

The induction tachometer C comprises an outer stator element 26 formed of laminated iron or other magnetizable material and secured to the shell 2, the outer stator element 26 carrying windings 28. As is conventional in units of this type, two sets of windings 28 are provided alternating circumferentially around the stator element 26, one set of windings being adapted to be energized by some appropriate external source and defining the exciting windings and the other set of windings being unenergized externally and defining the output windings. Since this construction is known, the electrical circuitry and the specific location of the windings are not here specifically illustrated.

The right hand end of the shell 2 is provided with a central opening 30 within which an end closure in the form of a plug 32 is received, the inner surface of the opening 30 and the outer surface of the plug 32 being correspondingly tapered so that the plug 32 will seat in its proper position. It is adapted to be held in position in any appropriate manner, either by welding or by the use of a retaining ring 34 which is in turn held in place by screws 36 received within tapped apertures 38 in the shell 2, the radially inner portions of the ring 34 being received within recesses 37 in the plug 32. At appropriate points cables 38 are adapted to extend out through the ring 34, those cables carrying the leads to the motor windings 12 and to the tachometer generator windings 28.

The plug 32 is provided with a central opening 40 adapted to receive a rod 42 with a slide fit, the rod being held in position by welding 44. This rod 42 extends axially into the space inside the outer stator element 26 and there carries a bushing 46 on which a core 48 of laminated core or other magnetizable material is mounted.

The radially inner surfaces 50 of the outer stator element 26 are inclined or tapered radially inwardly to the left as viewed in Fig. 1, and the radially outer surface 52 of the inner stator element or core 48 is substantially similarly tapered, a space being defined between the surfaces 50 and 52.

The rotor is in the form of a cup 54 of some suitable electrically conductive material mounted on and preferably integral with a bushing 56 which is received over and is secured to the end 16' of the motor rotor shaft 16. The cup 54 is received and is rotatable within the space between the stator surfaces 50 and 52, and in the form here specifically disclosed is tapered or inclined in substantially the same direction as the surfaces 50 and 52. An air gap is defined between the cup 50 and each of the surfaces 50 and 52. Because of the direct connection between the rotor cup 54 and the motor shaft 16, the rotor cup 54 can be seen to rotate with and at the same speed as the motor shaft 16.

As is well known in the art of induction tachometers, while the cup rotor 54, often termed a "drag cup," is stationary no flux will link the exciting and output windings of the tachometer generator C, and consequently the output windings will have no output. As the rotor cup 54 rotates, however, it will in effect "drag" some of the flux emanating from the exciting windings of the tachometer generator around to link with the output windings, thus producing a voltage output in the latter windings. The magnitude of that voltage output will be dependent upon the speed of rotation of the cup rotor 54.

As the temperature of the machine varies, the resistance of the windings 28 will also vary. Accompanying an increasing winding resistance will be an increased amount of electrical loss in the windings, and for a given speed of rotation of the rotor 54 this will cause a drop in the voltage output of the generator. Conversely, with a reduction in temperature the voltage output will increase for a given speed of rotation of the cup rotor 54.

In accordance with the present invention compensation for this undesirable effect, which obviously adversely affects the accuracy of the generator as a speed indicator, is achieved through appropriate variation of the magnetic circuit of the generator, causing a decrease in the reluctance of that magnetic circuit which compensates for the increase in the resistance of the windings attendant upon a rise in temperature. This increases the magnitude of the flux in the magnetic circuit, and hence the flux which links the output windings and induces an output voltage therein.

Figure 2:
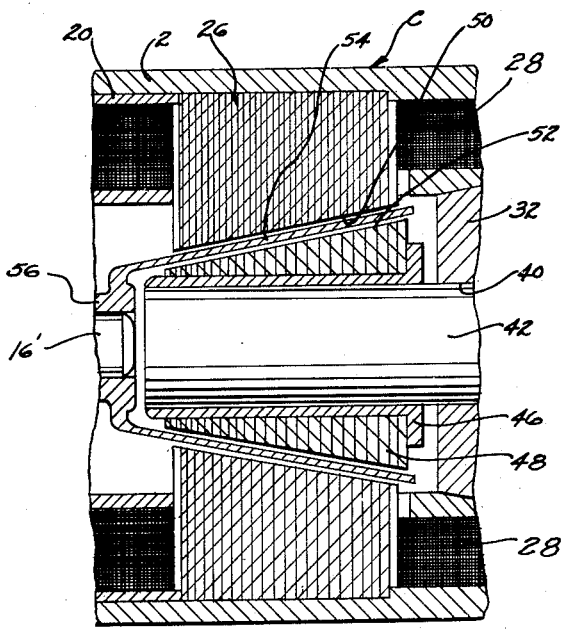
Fig. 2 is a cross sectional view on an enlarged scale of a portion of the tachometer unit of Fig. 1.

To this end, in the embodiment of Figs. 1 and 2, the rod 42 is formed of a material which has a temperature coefficient of expansion greater than that of the shell 2. Hence, with an increase in temperature, while the outer stator element 26 will move to the left a certain small distance from the right hand end of the machine because of expansion of the shell 2, the inner stator core 48 will move in the same direction but to an increased degree. Because of the inclination of the stator element surfaces 50 and 52, this will result in a lessening of the space between those surfaces or, in other words, a decrease in the length of the air gap in the magnetic circuit. Consequently the overall reluctance of the circuit will be decreased and a greater flux will pass across that space or gap. Hence for a given speed of rotation of the cup rotor 54 flux of greater magnitude will be linked with the output windings of the tachometer generator. By proper choice of material based upon known temperature coefficients of expansion of those materials, the decrease in reluctance and consequent increase in flux magnitude can be caused to accurately compensate for the increases in resistance of the windings 28 attendant upon a given rise in temperature.

In addition to altering the width of the space between the surfaces 50 and 52, this differential movement as between the outer stator element 26 and the inner stator element 48 is effective to bring a greater amount of iron or other magnetizable material into the space inside the outer stator element 26, and this too may have the effect of decreasing the overall reluctance of the magnetic circuit. Where it is not desired to employ the tapered or inclined surfaces 50 and 52, compensation for temperature changes can be achieved solely by means of the amount of iron operatively positioned inside the outer stator element 26, by utilizing an inner stator core 48 which does not normally extend axially all the way through the outer stator element 26, the degree to which it is received therewithin varying with temperature in accordance with the difference between the temperature coefficients of expansion of the rod and of the remainder of the generator proper.

Figure 3:
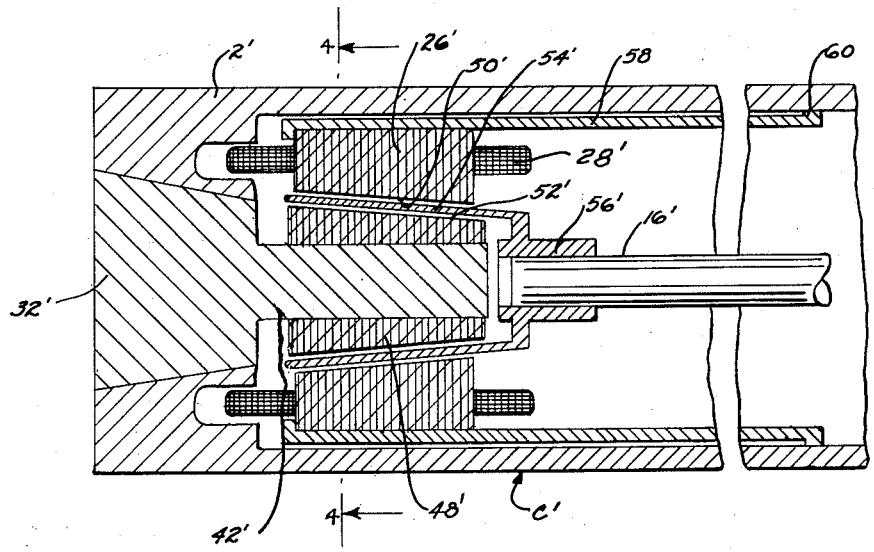
Fig. 3 is a cross sectional view similar to Fig. 2 but showing an alternative construction.
Figure 4:
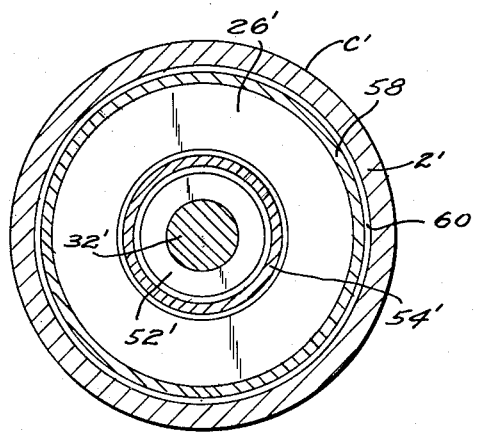
Fig. 4 is a cross sectional view taken along the line 4—4 of Fig. 3.

The embodiment of Figs. 3 and 4 is essentially similar, insofar as the tachometer generator structure is concerned, to the previously disposed embodiment and corresponding, but primed, reference numerals are applied thereto. However, in this latter embodiment it is the outer stator element 26 which is mounted on the machine by means of material having a greater temperature coefficient of expansion than the remainder of the machine. Thus the inner stator core 48' is secured to an extension 42' integral with the end closure 32' and formed of the same material as the end closure 32' and the shell 2'. The outer stator element 26' is not mounted directly on the shell 2', as in the previously described embodiment, but is instead secured to one end of a cylinder 58 extending inside the shell 2 and spaced therefrom, the other end 60 of the cylinder 58 being secured to the shell 2' at a point axially inside the stator element 26'. The cylinder 58 is formed of a material having a greater temperature coefficient of expansion than that of the material of which the parts 2', 32' and 42' are formed. Hence upon a rise in temperature the inner stator element 48' will move to the right relative to the left hand end of the machine for a certain distance but the outer stator element 26' will move a different distance dependent upon the difference between the temperature coefficients of expansion of the shell 2' and of the cylinder 58. This, it will be seen, will have substantially the same effect in increasing the reluctance of the magnetic circuit as the embodiment of Figs. 1 and 2.

While the differential expansion feature is here disclosed as applicable to two portions of the stator of the machine, it will be realized that relative movement occurs as between at least one of the stator elements and the rotor, this having the effect of varying the width of the air gap between that stator element and the rotor. Hence it will be apparent that, if desired, the use of appropriate mounting material as between the rotor and the stator could be relied upon to accomplish the same temperature compensation result.

The specific materials chosen for the various operative parts of the structure of this invention may vary widely. The temperature coefficients of expansion of different materials are well known characteristics thereof, and the selection of materials will be carried out according to well known physical principles in order to achieve the desired compensation for any given machine with any given set of windings having known variations in resistance in accordance with temperature. The selection of materials will in general be based upon the proposition that the ratio of the resistance of the windings to the reluctance of the magnetic system should remain constant as temperature changes.

While but a limited number of embodiments of the present invention have been disclosed, it will be apparent that many variations may be made therein, all within the scope of the invention as defined in the following claims.

I claim:

1. In a rotating electric machine comprising a support, a pair of operatively associated stator elements positioned on said support and separated from one another by a space, and a rotor mounted on said support and operatively associated with and rotatable relative to said stator elements with a gap therebetween, said stator elements and rotor being adapted to be linked by a magnetic field spanning said space and said gap; the improvement which comprises said stator elements being mounted on said support at least in part by means independent of one another, said mounting means for one stator element having a different temperature coefficient of expansion from said mounting means for said other stator element and being oriented in a direction operatively toward said other stator element, whereby the relative positions of said stator elements will change as the temperature of said machine changes, thereby varying the width of said space.

2. In an induction tachometer comprising a support, a radially outer stator element and a radially inner stator element mounted on said support and having opposed surfaces separated by a space, a cup rotor rotatably mounted on said support and rotatable within said space with a gap between itself and said stator elements, said stator elements and rotor being adapted to be linked by a magnetic field spanning said space and said gap; the improvement which comprises one of said stator elements being mounted on said support by means having a different temperature coefficient of expansion from the means by which said other stator element is mounted on said support, said first named means being oriented operatively toward said other stator element, whereby the relative position of said stator elements and hence the width of said space will change as the temperature of said tachometer changes.

3. In an induction tachometer comprising a support, a radially outer stator element and a radially inner stator element mounted on said support and having opposed surfaces separated by a space, a cup rotor rotatably mounted on said support and rotatable within said space with a gap between itself and said stator elements, said stator elements and rotor being adapted to be linked by a magnetic field spanning said space and said gap; the improvement which comprises said inner stator element being positioned radially inside said outer stator element, said opposed surfaces of said stator elements being substantially similarly inclined relative to the axis of said machine, one of said stator elements being mounted on said support by means having a different temperature coefficient of expansion from the means by which said other stator element is mounted on said support, said first named mounting means being oriented operatively in a direction substantially axially of said tachometer, whereby the relative position of said stator elements will change in a direction substantially axially of said tachometer as the temperature of said tachometer changes, thereby changing the width of said space.

4. In an induction tachometer comprising a support, a radially outer stator element and a radially inner stator element mounted on said support and having opposed surfaces separated by a space, a cup rotor rotatably mounted on said support and rotatable within said space with a gap between itself and said stator elements, said stator elements and rotor being adapted to be linked by a magnetic field spanning said space and said gap; the improvement which comprises said inner stator element being positioned radially inside said outer stator element, said opposed surfaces of said sets of stator elements being substantially similarly inclined relative to the axis of said machine, that portion of said cup rotor received within the space between said opposed surfaces being substantially similarly inclined, one of said stator elements being mounted on said support by means having a different temperature coefficient of expansion from the means by which said other stator element is mounted on said support, said first named mounting means being oriented operatively in a direction substantially axially of said tachometer, whereby the relative position of said stator elements will change in a direction substantially axially of said tachometer as the temperature of said tachometer changes, thereby changing the width of said space and said gap.

5. An induction tachometer comprising a shell having an end therefor, an outer stator element mounted on said shell, an inner stator element mounted on said end, said stator elements having opposed surfaces separated by a space, a cup rotor mounted on a shaft journaled in said shell, a portion of said cup rotor being received and rotatable within said space between said opposed surfaces of said stator elements, said stator elements and rotor being adapted to be linked by a magnetic field spanning said space between said opposed surfaces, one of said stator elements being mounted on said shell or end, as the case may be, by means having a different temperature coefficient of expansion from the means by which said other stator element is mounted on said end or shell, as the case may be, said first mentioned mounting means being oriented operatively substantially toward said other stator element, whereby the relative positions of said stator elements will change as the temperature of said tachometer changes, thereby varying the width of said space.

6. An induction tachometer comprising a shell having an end therefor, an outer stator element mounted on said shell, an inner stator element mounted on said end closure, said stator elements having opposed surfaces separated by a space, said inner stator element being positioned radially inside said outer stator element and said opposed surfaces of said stator elements being substantially similarly inclined relative to the axis of said machine, a cup rotor mounted on a shaft journaled in said shell, a portion of said cup rotor being received and rotatable within said space between said opposed surfaces of said stator elements and being inclined substantially similarly to said opposed surfaces, said stator elements and rotor being adapted to be linked by a magnetic field spanning said space between said opposed surfaces, one of said stator elements being mounted on said shell or end, as the case may be, by means having a different temperature coefficient of expansion from the means by which said other stator element is mounted on said end or shell, as the case may be, said first mentioned mounting means being oriented operatively substantially axially of said machine, whereby the relative positions of said stator elements will change as the temperature of said tachometer changes, thereby varying the width of said space.

7. The induction tachometer of claim 6, in which said first mentioned mounting means comprises a member extending from said end substantially axially toward said radially inner set of stator elements.

8. The tachometer of claim 6, in which said radially outer stator element is mounted on said shell by a member secured at one end to said outer stator element, extending substantially axially of said machine, and secured at its other end to said shell, said radially outer stator element being movable relative to said shell, said member comprising said first mentioned mounting means.

9. Electrical apparatus comprising a casing, first and second stator elements mounted on said casing, said stator elements having opposed surfaces separated by a space, a rotor rotatably mounted on said casing and rotatable within said space with a gap between itself and said stator elements, said stator elements and rotor being adapted to be linked by a magnetic field spanning said space and said gap, one of said stator elements being mounted on said casing by means having a different temperature coefficient of expansion from that of the material between said means and said other stator elements, said means being oriented operatively substantially toward said other stator elements, whereby the relative position of said one stator element and hence the width of said space will change as the temperature of said apparatus changes.

10. The apparatus of claim 9, in which said opposed surfaces of said stator elements are substantially radially spaced from one another and said rotor comprises a cup a portion of which is received between said opposed surfaces.

11. The apparatus of claim 10, in which said opposed stator element surfaces are inclined relative to the axis of rotation of said rotor.

12. The apparatus of claim 10, in which said opposed stator element surfaces are inclined relative to the axis of rotation of said rotor, and in which said opposed stator element surfaces and said rotor portion are all substantially similarly inclined.

13. Electrical apparatus comprising a casing having a side and an end, a first stator element mounted on said casing side, a second stator element mounted on said casing end, said stator elements having opposed surfaces separated by a space, a rotor rotatably mounted on said casing and rotatable within said space with a cap between itself and said stator elements, said stator elements and rotor being adapted to be linked by a magnetic field spanning said space and said gap, one of said stator elements being mounted on said casing side or end, as the case may be, by means having a different temperature coefficient of expansion from that of the material between said means and said other stator element, said means being oriented operatively substantially toward said other stator element, whereby the relative position of said one stator element and hence the width of said space will change as the temperature of said apparatus changes.

14. The apparatus of claim 13, in which said opposed surfaces of said stator elements are substantially radially spaced from one another and said rotor comprises a cup a portion of which is received between said opposed surfaces.

15. The apparatus of claim 14, in which said opposed stator element surfaces are inclined relative to the axis of rotation of said rotor.

16. The apparatus of claim 14, in which said opposed stator element surfaces are inclined relative to the axis of rotation of said rotor, and in which said opposed stator element surfaces and said rotor portion are all substantially similarly inclined.

17. In an induction tachometer comprising a support, a radially outer stator element and a radially inner stator element mounted on said support and having opposed surfaces separated by a space, a cup rotor rotatably mounted on said support and rotatable within said space with a gap between itself and said stator elements, said stator elements and rotor being adapted to be linked by a magnetic field spanning said space and said gap; the improvement which comprises one of said stator elements being mounted on said support by means having a different temperature coefficient of expansion from the material between said means and said other stator element, said means being oriented operatively toward said other stator element, whereby the relative position of said stator elements and hence the width of said space will change as the temperature of said tachometer changes.

18. In an induction tachometer comprising a support, a radially outer stator element and a radially inner stator element mounted on said support and having opposed surfaces separated by a space, a cup rotor rotatably mounted on said support and rotatable within said space with a gap between itself and said stator elements, said stator elements and rotor being adapted to be linked by a magnetic field spanning said space and said gap; the improvement which comprises one of said stator elements being mounted on said support by means having a different temperature coefficient of expansion from the material between said means and said other stator element, said means being oriented operatively in a direction substantially axially of said tachometer, whereby the relative position of said stator elements will change in a direction substantially axially of said tachometer as the temperature of said tachometer changes, thereby changing the width of said space.

19. In an induction tachometer comprising a support, a radially outer stator element and a radially inner stator element mounted on said support and having opposed surfaces separated by a space, a cup rotor rotatably mounted on said support and rotatable within said space with a gap between itself and said stator elements, said stator elements and rotor being adapted to be linked by a magnetic field spanning said space and said gap; the improvement which comprises one of said stator elements being mounted on said support by means having a different temperature coefficient of expansion from the material between said means and said other stator element, said means being oriented operatively in a direction substantially axially of said tachometer, whereby the relative position of said stator elements will change in a direction substantially axially of said tachometer as the temperature of said tachometer changes, thereby changing the width of said space and said gap.

References Cited in the file of this patent

UNITED STATES PATENTS

| | | |
|---|---|---|
| 944,061 | Varley | Dec. 21, 1909 |
| 1,626,681 | MacGahan | May 3, 1927 |
| 2,191,074 | Herrington | Feb. 20, 1940 |